United States Patent
Wang et al.

(10) Patent No.: US 7,345,440 B2
(45) Date of Patent: Mar. 18, 2008

(54) METHOD FOR STARTING SINGLE PHASE BLDCM HAVING ASYMMETRICAL AIR GAP

(75) Inventors: Weizi Wang, Shanghai (CN); Zhigan Wu, Shanghai (CN); Wanbing Jin, Shanghai (CN); Jianping Ying, Shanghai (CN); Qiong Yuan, Shanghai (CN); Shih-Ming Huang, Taoyuan Shien (TW); Wen-Shi Huang, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 127 days.

(21) Appl. No.: 11/284,167

(22) Filed: Nov. 21, 2005

(65) Prior Publication Data

US 2006/0197478 A1    Sep. 7, 2006

(30) Foreign Application Priority Data

Mar. 2, 2005    (TW) .............................. 94106368 A

(51) Int. Cl.
*H02P 1/00*    (2006.01)
(52) U.S. Cl. ........................ 318/254; 318/439; 318/138
(58) Field of Classification Search .................... None
See application file for complete search history.

(56) References Cited

U.S. PATENT DOCUMENTS 5,028,852 A * 7/1991 Dunfield ..................... 318/254
5,465,019 A * 11/1995 Kliman .................. 310/156.04
5,569,990 A * 10/1996 Dunfield ..................... 318/254
5,598,071 A * 1/1997 Dunfield et al. ............. 318/254
5,796,194 A * 8/1998 Archer et al. ............... 310/68 B
5,986,419 A * 11/1999 Archer et al. ............... 318/254
RE37,576 E * 3/2002 Stephens et al. ............ 310/254

(Continued)

FOREIGN PATENT DOCUMENTS

JP    61269656 A  * 11/1986

(Continued)

OTHER PUBLICATIONS

S. Bentouati, Z.Q. Zhu and D. Howe, "Permanent Magnet Brushless DC Motors For Consumer Products" (http://mag-net.ee.umist.ac.uk/reports/P11/p11.html), printed Oct. 28, 2005.

*Primary Examiner*—Lincoln Donovan
*Assistant Examiner*—Eduardo Colon
(74) *Attorney, Agent, or Firm*—Volpe and Koenig, PC

(57) ABSTRACT

A method for starting a motor having a stator, a rotor, a winding and an asymmetrical air gap is accomplished using several steps. The steps include: (a) providing the motor at standstill; (b) exciting the winding for a specific time period with a current impulse having a first amplitude to obtain a first specific position of the rotor with respect to the stator; (c) decreasing the first amplitude down to a second amplitude gradually by a controller to make the rotor to be positioned at a second specific position with respect to the stator after the specific time period, wherein the second amplitude is one of zero ampere and a specific value close to zero ampere, and the rotor is rotating close to the second specific position with an almost zero rotating speed when the second amplitude is reached.

16 Claims, 4 Drawing Sheets

U.S. PATENT DOCUMENTS

| | | | |
|---|---|---|---|
| 6,570,351 B2 * | 5/2003 | Miyazaki et al. | 318/254 |
| 6,774,590 B2 * | 8/2004 | Inagawa et al. | 318/139 |
| 7,095,204 B2 * | 8/2006 | Lee et al. | 318/700 |
| 7,202,623 B2 * | 4/2007 | Zhou et al. | 318/439 |
| 2003/0107353 A1 * | 6/2003 | Nakamura et al. | 322/89 |
| 2006/0076911 A1 * | 4/2006 | Kuroshima et al. | 318/254 |
| 2006/0082336 A1 * | 4/2006 | Kurosawa et al. | 318/254 |
| 2006/0132075 A1 * | 6/2006 | Lee et al. | 318/439 |

FOREIGN PATENT DOCUMENTS

| | | | |
|---|---|---|---|
| JP | 2000201493 A | * | 7/2000 |

* cited by examiner (a) Position 1     (b) Position 2

METHOD FOR STARTING SINGLE PHASE BLDCM HAVING ASYMMETRICAL AIR GAP

FIELD OF THE INVENTION

The present invention relates in general to the control of a single phase brushless DC motor (BLDCM). More particularly, the present invention relates to the starting method for a Hall-less single phase BLDCM having an asymmetrical air gap.

BACKGROUND OF THE INVENTION

The single phase BLDCM is widely used in low starting torque and small power fields such as pumps, blowers and cooling fans. The single phase BLDCM requires a suitable current commutation signal synchronized with the rotor position for proper operation. In most applications, a Hall-effect position sensor is used to detect the rotor position and control the motor. However, the Hall sensor itself increases the size of the motor system and the manufacturing costs. Besides, the Hall sensor decreases the capability of the system against the environment variation, e.g., the temperature variation. Many Hall-less BLDCM drives that detect the rotor position have been introduced (e.g., U.S. Pat. No. 5,986,419).

The single phase motors have null-points in their torque waveforms, which make them difficult to start sometimes. To overcome this problem, an asymmetrical air gap is employed to introduce a reluctance torque component. FIGS. 4(a) to 4(d) shows some typical models of this kind. A paper, S. Bentouati, Z. Q. Zhu and D. Howe, "Permanent Magnet Brushless DC Motors For Consumer Products", The European Network for Permanent Magnet Devices Report (<http://mag-net.ee.umist.ac.uk/reports/P11/p11.html>), has proved that tapered-air gap is the best configuration among the above-mentioned models according to cogging torque peak value. The motors involved in the present invention adopt this kind of asymmetrical air gap to overcome their starting null-points.

Most of these applications require the motor to rotate in one predetermined direction. But the direction control becomes very difficult when the system is running in sensorless mode, more clearly in Hall-less mode, because the controller cannot determine the rotor's initial position. During the motor's starting procedure, the controller should solve this problem firstly.

Keeping the drawbacks of the prior arts in mind, and employing experiments and research full-heartily and persistently, the applicants finally conceived a method for starting a single phase BLDCM having an asymmetrical air gap. This invention is mainly about how to solve the above-mentioned problem. A novel method is introduced to make the motor start up from standstill to rotating in a preferred direction.

SUMMARY OF THE INVENTION

It is therefore an object of the present invention to propose a method for starting a single phase BLDCM having an asymmetrical air gap and under the Hall-less condition such that the BLDCM at standstill could be rotated in the required direction.

It is therefore another object of the present invention to position the rotor of a single phase BLDCM having an asymmetrical air gap and under the Hall-less condition at a specific position through exciting a winding of the same by a current impulse having a first amplitude for a certain time period and decreasing the first amplitude down to a second amplitude after that so as to apply the current impulse having a third amplitude to the winding to make the rotor rotate in a required direction after the rotor is positioned at the specific position.

According to the first aspect of the present invention, the method for starting a motor having a stator, a rotor and a winding includes the steps of: (a) providing the motor at standstill; (b) exciting the winding for a specific time period with a current impulse having a first amplitude; (c) decreasing the first amplitude down to a second amplitude to obtain a specific position of the rotor with respect to the stator after the specific time period; and (d) starting the rotor to rotate in a first direction according to the specific position.

Preferably, the motor is a Hall-less single phase BLDCM having a plurality of magnetic poles and an asymmetric air-gap configuration.

Preferably, the current impulse having the first amplitude has a predetermined direction and a magnitude enough to start the rotor.

Preferably, the predetermined direction is one of a positive direction and a negative direction.

Preferably, the second amplitude is one of zero ampere and a specific value close to zero ampere, and the rotor is rotating close to the specific position with an almost zero rotating speed when the second amplitude is reached.

Preferably, the motor further includes a controller for decreasing the first amplitude down to the second amplitude gradually so as to make the rotor be positioned at the specific position.

Preferably, the controller provides the current impulse having a third amplitude to the winding to make the rotor rotate in a second direction after the rotor is positioned at the specific position.

Preferably, the controller detects a back electromotive force (BEMF) in the winding after the rotor rotated in the second direction and controls the motor for commutating according to the BEMF.

Preferably, the motor further includes an eccentric air-gap, and the current impulse having the first amplitude results in that a specific tooth of the stator generates a magnetic field such that a portion of the tooth close to the air-gap has a polarity of S pole and a portion of the rotor positioned at the specific position and corresponding to the tooth has a polarity of N pole.

Preferably, the motor further includes an eccentric air-gap, and the current impulse having the first amplitude results in that a specific tooth of the stator generates a magnetic field such that a portion of the tooth close to the air-gap has a polarity of N pole and a portion of the rotor positioned at the specific position and corresponding to the tooth has a polarity of S pole.

Preferably, the specific time period is long enough to prevent the rotor from over rotation resulting from an inertia.

According to the second aspect of the present invention, the method for positioning a rotor of a motor having a stator and a winding includes the steps of: (a) providing the motor at standstill; (b) exciting the winding for a specific time period with a current impulse having a first amplitude; and (c) decreasing the first amplitude down to a second amplitude to obtain a specific position of the rotor with respect to the stator after the specific time period.

Preferably, the motor is a Hall-less single phase BLDCM having a plurality of magnetic poles and an asymmetric air-gap configuration.

Preferably, the current impulse having the first amplitude has a predetermined direction and a magnitude enough to start the rotor.

Preferably, the predetermined direction is one of a positive direction and a negative direction.

Preferably, the second amplitude is one of zero ampere and a specific value close to zero ampere, and the rotor is rotating close to the specific position with an almost zero rotating speed when the second amplitude is reached.

Preferably, the first amplitude is decreased down to the second amplitude gradually so as to make the rotor be positioned at the specific position.

Preferably, the motor further includes an eccentric air-gap, and the current impulse having the first amplitude results in that a specific tooth of the stator generates a magnetic field such that a portion of the tooth close to the air-gap has a polarity of S pole and a portion of the rotor positioned at the specific position and corresponding to the tooth has a polarity of N pole.

Preferably, the motor further includes an eccentric air-gap, and the current impulse having the first amplitude results in that a specific tooth of the stator generates a magnetic field such that a portion of the tooth close to the air-gap has a polarity of N pole and a portion of the rotor positioned at the specific position and corresponding to the tooth has a polarity of S pole.

Preferably, the specific time period is long enough to prevent the rotor from over rotation resulting from an inertia.

The present invention may best be understood through the following descriptions with reference to the accompanying drawings, in which:

The present invention may best be understood through the following descriptions with reference to the accompanying drawings, in which:

DETAILED DESCRIPTION OF THE PREFERRED EMBODIMENT

Figure 1:
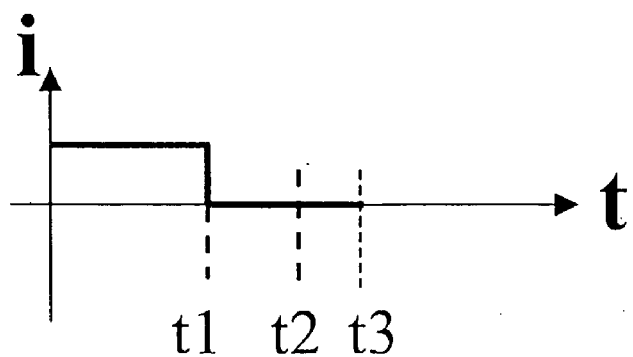
FIG. 1 is a graph of current versus time illustrating the current impulse for positioning the rotor of a single phase permanent magnet motor disclosed in the prior art of the U.S. Pat. No. 5,986,419.
Figure 3:
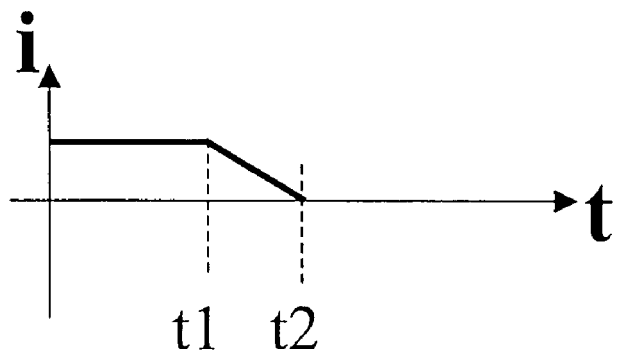
FIG. 3 is a graph of current versus time illustrating the current impulse for positioning the rotor of a Hall-less single phase BLDCM having an asymmetrical air gap, in which the current impulse value at time t2 is equal to zero ampere and the rotor is positioned at a specific position at time t2.

Please refer to FIGS. 1 and 3. FIG. 1 is the graph of current versus time illustrating the current impulse for positioning the rotor of a single phase permanent magnet motor disclosed in the prior art of the '419 Patent and FIG. 3 is the graph of current versus time illustrating the current impulse for positioning the rotor of a Hall-less single phase BLDCM having an asymmetrical air gap, in which the current impulse value at time t2 is equal to zero ampere and the rotor is positioned at a specific position at time t2, respectively. The method of starting a single phase permanent magnet motor disclosed in the '419 Patent has the drawbacks of failing to position the rotor due to the oscillation of the rotor. On the contrary, the method proposed in the present invention could avoid the drawbacks of the '419 Patent and has relatively better effects for positioning the rotor of the single phase BLDCM having an asymmetrical air gap.

Figure 2:
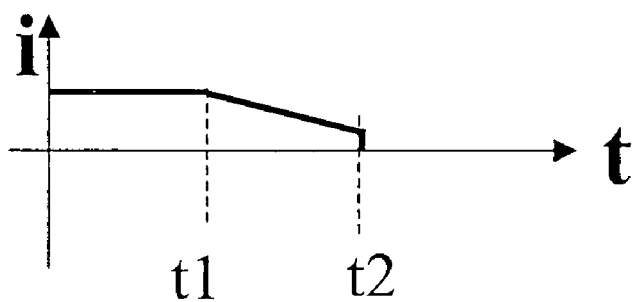
FIG. 2 is a graph of current versus time illustrating the current impulse for positioning the rotor of a Hall-less single phase BLDCM having an asymmetrical air gap, in which the current impulse value at time t2 is close to zero ampere and the rotor is rotating close to a specific position with an almost zero rotating speed at time t2.

Please refer to FIG. 2. FIG. 2 is the graph of current versus time illustrating the current impulse for positioning the rotor of a Hall-less single phase BLDCM having an asymmetrical air gap. In which, the current impulse having the first amplitude is decreased down to a second amplitude having a value close to zero ampere gradually during the time period between t1 and t2, and the rotor is rotating close to a specific position with an almost zero rotating speed at time t2.

Please refer to FIG. 3 again. From FIG. 3, one with an ordinary skill in the field would know that a current impulse having a first amplitude is employed for exciting a winding of the motor for a specific time period (from time 0 to t1), which is long enough to prevent the rotor from over rotation resulting from an inertia, and the first amplitude is decreased down to a second amplitude (e.g., zero ampere) gradually and the rotor of the motor will be positioned at a specific position at time t2, and the rotor could be controlled and rotated in a required direction by the current impulse having a third amplitude after that. A controller of the motor detects a BEMF in the winding after the rotor rotated in the required direction and controls the motor for commutating according to the BEMF.

Figure 4:
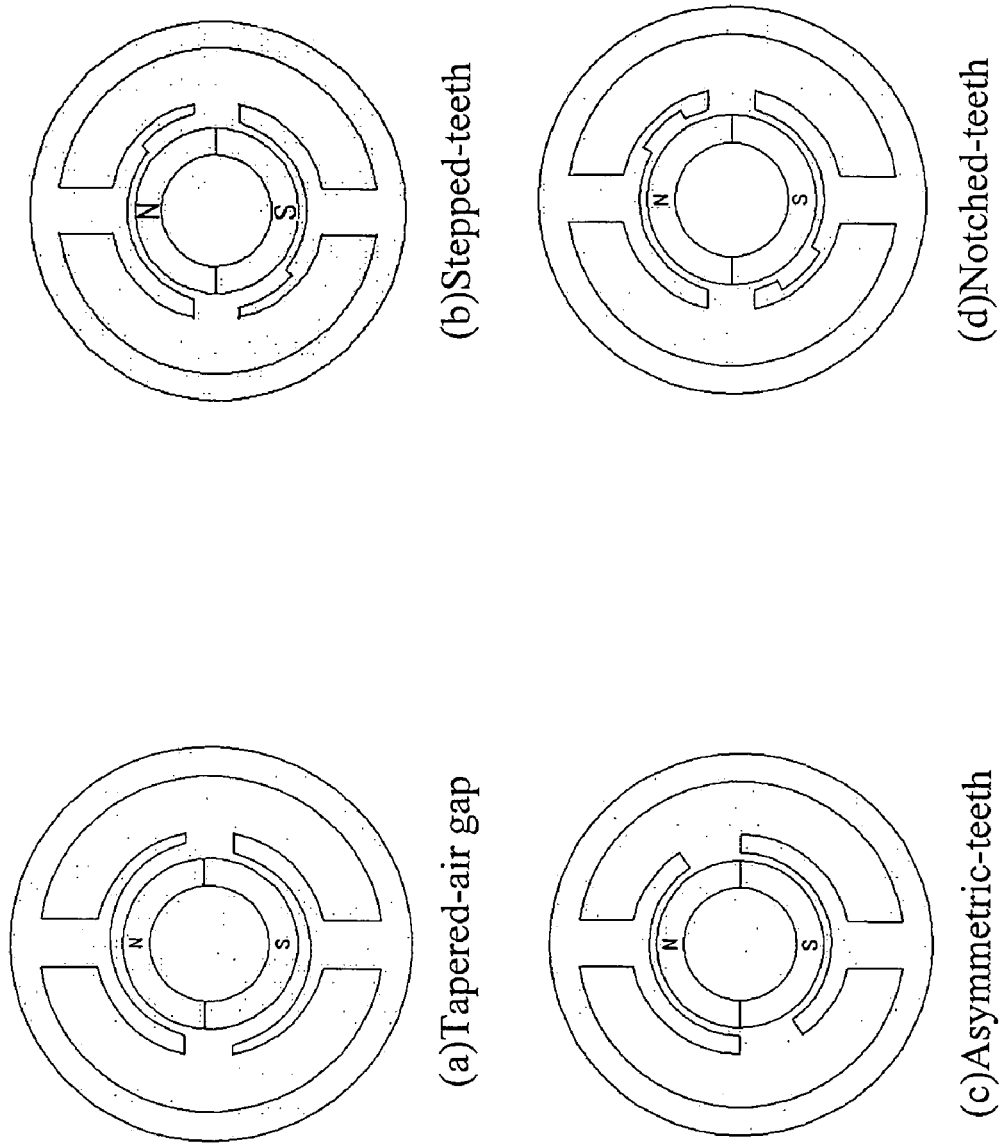
FIGS. 4(a) to 4(d) are respectively the schematic diagrams of the four different structures of the single phase BLDCM having an asymmetrical air gap in the prior art, which are applicable to the present invention.

Please refer to FIGS. 4(a) to 4(d), four different structures of the single phase BLDCM having an asymmetrical air gap in the prior art, which have the tapered air gap, the stepped-teeth, the asymmetrical-teeth and the notched-teeth respectively and are applicable to the present invention, are shown. In which, each structure just has two stator teeth and two permanent magnet poles, N and S. Surely, the methods proposed in the present invention are applicable to the structures having more than two stator teeth and more than two permanent magnet poles also. In the present invention, the proposed starting methods are analyzed based on the structure having the tapered air gap as shown in FIG. 4(a).

Figure 5:
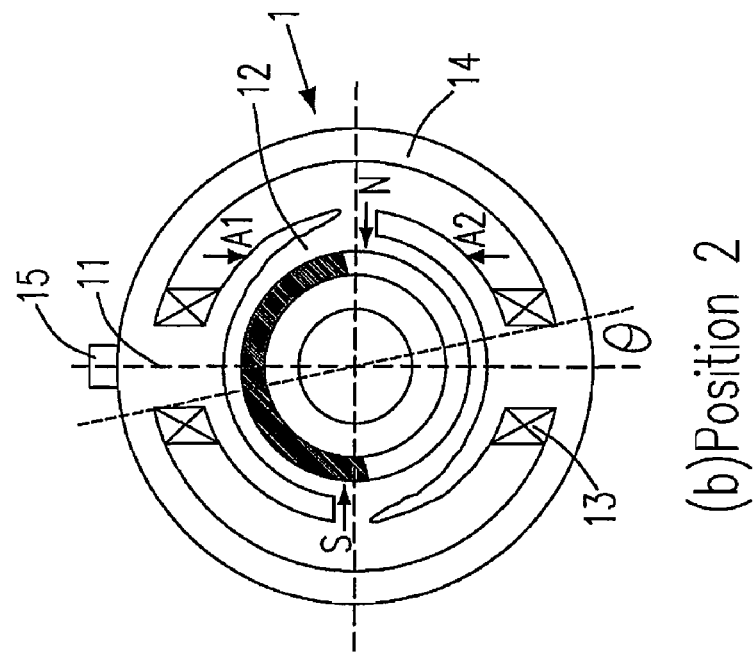
FIGS. 5 (a) and 5(b) illustrate the two possible positions of a resting rotor of the single phase BLDCM with asymmetrical air gap of the present invention respectively.
Figure 5:
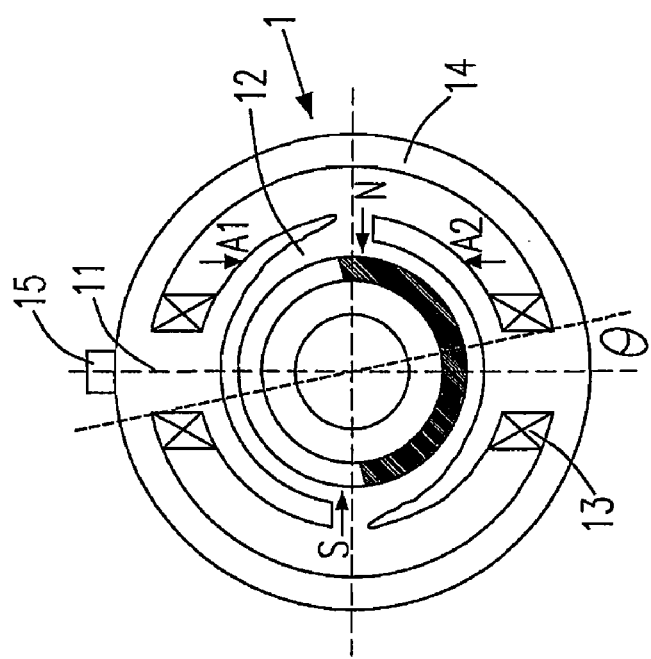

When a single phase BLDCM having an asymmetrical air gap 1, which includes a stator 11, a rotor 12, a winding 13, a case 14, and a controller 15, keeps at standstill, the position of its rotor 12 with respect to its stator 11 has two possibilities, Position 1 and Position 2, as shown in FIGS. 5(a) and 5(b) respectively. That is, the polarity of the rotor pole aligned with the special stator tooth named A1, as shown in FIGS. 5(a) and 5(b), is either south pole labeled as S (as shown in FIG. 5(a)) or north pole labeled as N (as shown in FIG. 5(b)).

Figure 6:
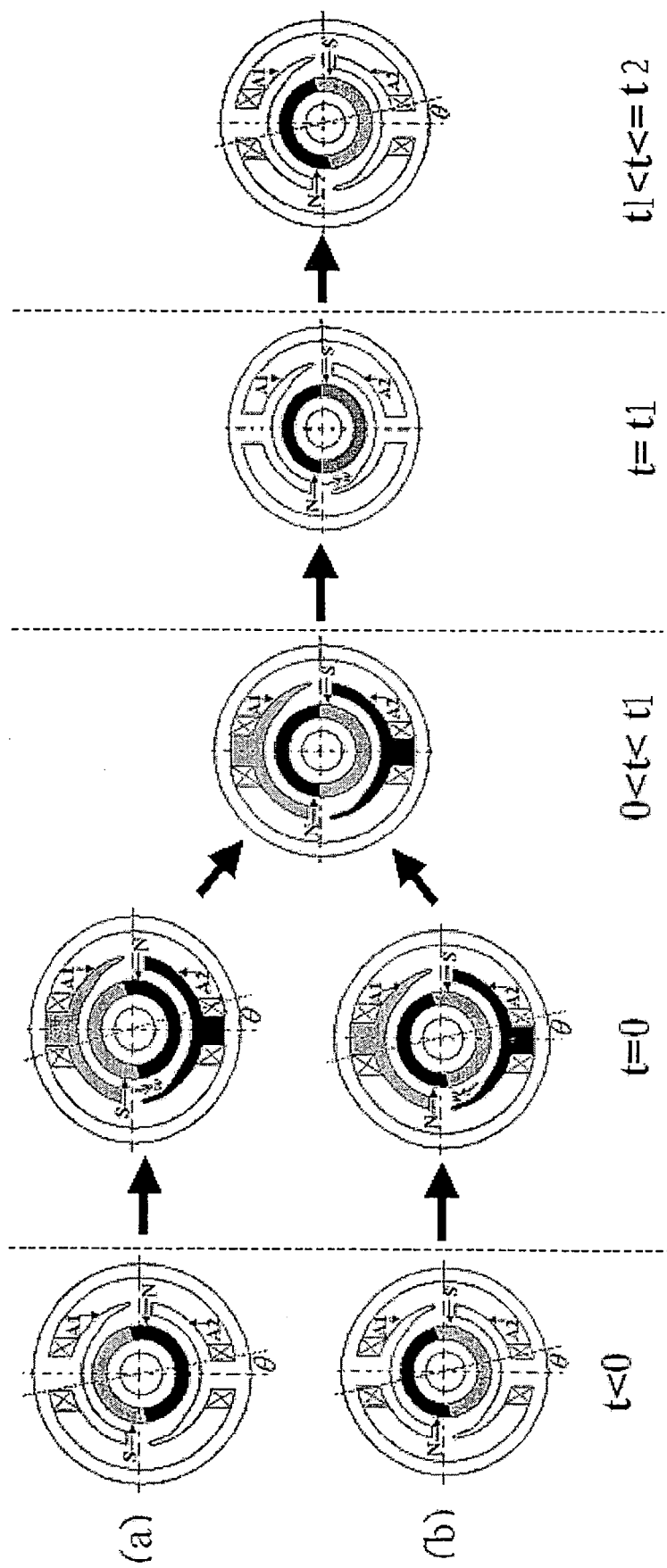
FIG. 6 is a schematic diagram illustrating the positioning and commutating processes of rotor beginning with two different initial positions as shown in FIGS. 5(a) and 5(b) respectively.

In FIGS. 5(a), 5(b) and 6, the teeth of the stator 11 of the motor model are labeled as A1 and A2, and the black portion represents the north pole N of the rotor 12/tooth A2 and the gray portion is the south pole S of the rotor 12/tooth A1 respectively. Besides, it is assume that the face towards the air gap of tooth A1 has the south polarity and the same of A2 has the north polarity while a positive current pulse is supplied to the winding 13. Conversely, when a negative current pulse is supplied to the winding 13, the color of A1 and A2 will be exchanged, that is, the polarity of the faces will be exchanged.

Since the controller 15 is based on the sensorless control, which cannot get the position of the rotor 12 with respect to the stator 11 when rotor 12 is at standstill and the direction of the first current impulse can not be determined according to the required rotating direction of the rotor 12, special starting methods should be adopted to realize the motor's start-up in the required direction. After the single phase BLDCM having an asymmetrical air gap 1 is running in the right direction, the system based on sensorless control can commutate the single phase BLDCM having an asymmetrical air gap 1 successfully because it can get the information of the BEMF during rotor motion easily. So, the key issue of the proposed starting methods is to realize the motor's start-up in the required direction.

The resting rotor 12 has two possible positions, as shown in FIGS. 5(a) and 5(b). If the controller 15 supplies a positive current impulse, as shown in FIGS. 2 and 3, to the winding 13 for a sufficient period of time and then decreases the amplitude of the current impulse to zero slowly such that the face towards the air gap of the tooth A1 has the south polarity and the same of A2 has the north polarity, and the rotor 12 will stop at the specific position determined by the direction of the current impulse. The positioning and commutating processes of rotor 12 beginning with two different initial positions, as shown in FIGS. 5(a) and 5(b) respectively, are shown in FIG. 6 and are analyzed further as follows.

In FIG. 6, when t<0, the rotor 12 of the single phase BLDCM having an asymmetrical air gap 1 is at standstill and the position of the rotor 12 with respect to the stator 11 has two possibilities as shown in FIGS. 5(a) and 5(b) respectively.

In FIG. 6, when t=0, the current impulse is employed for exciting the wiring 13. If the initial position of the rotor 12 with respect to the stator 11 is at Position 1 (as shown in FIG. 5(a)), the portion of the rotor 12 corresponding to the tooth A1 of the single phase BLDCM having an asymmetrical air gap 1 has the same polarity, S, as the face towards the air gap of the tooth A1 of the stator 11, and the current impulse results in the counterclockwise rotation of the rotor 12 firstly. If the initial position of the rotor 12 with respect to the stator 11 is at Position 2 (as shown in FIG. 5(b)), the portion of the rotor 12 corresponding to the tooth A1 of the single phase BLDCM having an asymmetrical air gap 1 has the polarity of N and the face towards the air gap of the tooth A1 of the stator 11 has the opposite polarity of S, and the current impulse results in the clockwise rotation of the rotor 12 secondly.

In FIG. 6, when 0<t<t1, the current impulse keeps on, and the rotor 12 will rotate an electrical angle of $(\pi-\theta)$ degrees ($\theta$ is the angle between the stator axis and the rotor axis when the rotor 12 is at standstill) if the initial position of the rotor 12 with respect to the stator 11 is at Position 1 as shown in FIG. 5(a), where the polarity of the face towards the air gap of the tooth A1 of the stator 11, S, and the polarity of the rotor 12 under the tooth A1 of the stator 11, N, are opposite and the rotor 12 is attracted by the stator 11 firstly. Here, the time period between 0 and t1 should be long enough to prevent the rotor 12 from over rotation caused by the inertia. In FIG. 6, when 0<t<t1, the impulse keeps on, and the rotor 12 will rotate an electrical angle of $\theta$ degrees if the initial position of the rotor 12 with respect to the stator 11 is at Position 2 as shown in FIG. 5(b), where the polarity of the face towards the air gap of the tooth A1 of the stator 11, S, and the polarity of the rotor 12 under the tooth A1 of the stator 11, N, are opposite and the rotor 12 is attracted by the stator 11 secondly.

In FIG. 6, when t=t1, the rotor 12 stops after vibrating for a moment at the specific position, where the stator axis and the rotor axis will meet together either the initial position of the rotor 12 is at Position 1 as shown in FIG. 5(a), or at Position 2 as shown in FIG. 5(b).

In FIG. 6, when t1<t<=t2, the current impulse is decreased gradually and the rotor 12 yields a counterclockwise rotation, and eventually offsets an electrical angle of $\theta$ degrees and stops at Position 2 as shown in FIG. 5(b) under the interaction of cogging torque and electromagnetic torque. That is, after the positive current impulse acts, the rotor 12 would stop at Position 2 no matter the initial position of the rotor 12 is at Position 1, or at Position 2. After that, the controller 15 can control the single phase BLDCM having an asymmetrical air gap 1 to rotate in the desired direction easily. For example, if the rotor 12 is positioned at Position 2 and detected by the controller 15, a negative current impulse or a positive current impulse can be employed by the controller 15 to let the rotor 12 yield a counterclockwise rotation or a clockwise rotation respectively. The controller 15 could be employed to control the rotor 12 for commutating according to the BEMF easily since the BEMF can be detected during the rotating of the rotor 12.

Similarly, if the controller 15 employs a negative current impulse to excite the winding 13, the rotor 12 will stop at Position 1 as shown in FIG. 5(a) in spite of the initial position of the rotor 12.

Furthermore, the current impulse should be decreased to zero slowly after time t1 as shown in FIGS. 2 and 3. Otherwise, the rotor 12 may vibrate seriously, even deviate from the expected position and stop unexpectedly, which eventually results in the failure of start-up.

All above tells that the rotor 12 stops at the special position determined by the polarity of the current impulse. After determining the rotor position, the controller can control the motor to rotate in the desired direction easily. As above-mentioned, if the controller 15 knows that the position of the rotor 12 is Position 2, a negative current can be used to let rotor 12 yield counterclockwise rotation or a positive current can be used to let the rotor 12 yield clockwise rotation. Of course, the clockwise rotation may be finished quickly if there isn't any commutating. But the time should always be long enough for the controller 15 to detect the BEMF, which is the key during commutating, and commutate the motor accordingly.

The key issues of the proposed method are the time length and the magnitude of the current impulse. The criterion of the former is that the time should be long enough to prevent the rotor from over rotation resulting from the inertia. And the criterion of the latter is that the current impulse can drive the rotor rotating under the different rotor initial conditions. Obviously, different motor needs different current impulse for starting.

In conclusion, the proposed methods of the present invention are meant to determine the initial position of the rotor 12 with respect to the stator 11 by the controller 15 of a Hall-less single phase BLDCM having a asymmetrical air gap 1 and is employed to position the rotor 12 at a specific position through exciting a winding 13 of the same by a current impulse having a first amplitude for a certain time period and decreasing the first amplitude down to a second amplitude after that so as to apply the current impulse having a third amplitude to the winding 13 to make the rotor 12 rotate in a required direction after the rotor 12 is positioned at the specific position firstly. The controller 15 detects a BEMF in the winding 13 after the rotor 12 rotated in the required direction and controls the motor 1 for commutating according to the BEMF secondly. The drawbacks of failing to position the rotor due to the oscillation of the rotor in the prior art are overcome by the provided method.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A method for starting a motor having a stator, a rotor and a winding, comprising the steps of:
   (a) providing said motor at standstill;
   (b) exciting said winding for a specific time period with a current impulse having a first amplitude to obtain a first specific position of said rotor;
   (c) decreasing said first amplitude down to a second amplitude gradually by a controller to make said rotor be positioned at a second specific position with respect to said stator after said specific time period, wherein said second amplitude is one of zero ampere and a specific value close to zero ampere, and said rotor is rotating close to said second specific position with an almost zero rotating speed when said second amplitude is reached; and
   (d) starting said rotor to rotate in a first direction according to said second specific position.

2. The method according to claim 1, wherein said motor is a Hall-less single phase BLDCM having a plurality of magnetic poles and an asymmetric air-gap configuration.

3. The method according to claim 1, wherein said current impulse having said first amplitude has a predetermined direction and a magnitude enough to start said rotor.

4. The method according to claim 3, wherein said predetermined direction is one of a positive direction and a negative direction.

5. The method according to claim 1, wherein said controller provides said current impulse having a third amplitude to said winding to make said rotor rotate in a second direction after said rotor is positioned at said second specific position.

6. The method according to claim 5, wherein said controller detects a back electromotive force (BEMF) in said winding after said rotor rotated in said second direction and controls said motor for commutating according to said BEMF.

7. The method according to claim 1, wherein said motor further comprises an eccentric air-gap, and said current impulse having said first amplitude results in that a specific tooth of said stator generates a magnetic field such that a portion of said tooth close to said air-gap has a polarity of S pole and a portion of said rotor positioned at said second specific position and corresponding to said tooth has a polarity of N pole.

8. The method according to claim 1, wherein said motor further comprises an eccentric air-gap, and said current impulse having said first amplitude results in that a specific tooth of said stator generates a magnetic field such that a portion of said tooth close to said air-gap has a polarity of N pole and a portion of said rotor positioned at said second specific position and corresponding to said tooth has a polarity of S pole.

9. The method according to claim 1, wherein said specific time period is long enough to prevent said rotor from over rotation resulting from an inertia.

10. A method for positioning a rotor of a motor having a stator and a winding, comprising the steps of:
    (a) providing said motor at standstill;
    (b) exciting said winding for a specific time period with a current impulse having a first amplitude to obtain a first specific position of said rotor; and
    (c) decreasing said first amplitude down to a second amplitude gradually by a controller to make said rotor be positioned at a second specific position with respect to said stator after said specific time period, wherein said second amplitude is one of zero ampere and a specific value close to zero ampere, and said rotor is rotating close to said second specific position with an almost zero rotating speed when said second amplitude is reached.

11. The method according to claim 10, wherein said motor is a Hall-less single phase BLDCM having a plurality of magnetic poles and an asymmetric air-gap configuration.

12. The method according to claim 10, wherein said current impulse having said first amplitude has a predetermined direction and a magnitude enough to start said rotor.

13. The method according to claim 12, wherein said predetermined direction is one of a positive direction and a negative direction.

14. The method according to claim 10, wherein said motor further comprises an eccentric air-gap, and said current impulse having said first amplitude results in that a specific tooth of said stator generates a magnetic field such that a portion of said tooth close to said air-gap has a polarity of S pole and a portion of said rotor positioned at said second specific position and corresponding to said tooth has a polarity of N pole.

15. The method according to claim 10, wherein said motor further comprises an eccentric air-gap, and said current impulse having said first amplitude results in that a specific tooth of said stator generates a magnetic field such that a portion of said tooth close to said air-gap has a polarity of N pole and a portion of said rotor positioned at said second specific position and corresponding to said tooth has a polarity of S pole.

16. The method according to claim 10, wherein said specific time period is long enough to prevent said rotor from over rotation resulting from an inertia.

* * * * *